United States Patent Office 3,418,369
Patented Dec. 24, 1968

3,418,369
1-AMINOBICYCLOOCT-2-ENES AND BICYCLOOCT-
2-ENE-1-METHYLAMINES
James C. Kauer, Wilmington, Del., assignor to E. I. du
Pont de Nemours and Company, Wilmington, Del., a
corporation of Delaware
No Drawing. Filed Mar. 24, 1966, Ser. No. 536,996
11 Claims. (Cl. 260—563)

This invention relates to substituted bicyclo[2.2.2]oct-2-enes. More particularly this invention refers to novel bicyclo[2.2.2]oct-2-enes having an amino or substituted amino group attached directly or through a methylene group to a tertiary or bridgehead nuclear carbon.

The need continues for effective antiviral agents useful for the treatment of virus infections. I have now discovered a novel class of 1-aminobicyclooct-2-enes and bicyclooct-2-ene-1-methylamines which show outstanding properties in their ability to inhibit and deter incidence and growth of a variety of harmful viruses.

Within the class of compounds of this invention, a remarkable wide range of activity has been noted in standard tissue culture and animal tests. For example, activity in tissue culture tests has been observed against influenza A (strains WSN and swine) and influenza B (strains Taiwan and GL). In vivo tests in mice have indicated activity against influenza A (swine) and influenza $A_2$ (Michigan A/AA).

The compounds of this invention have the formula

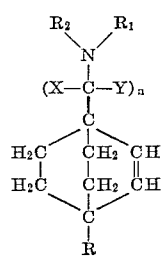

where

R is hydrogen or alkyl of 1 through 4 carbon atoms;
$n$ is 0 or 1;
X, Y, $R_1$ and $R_2$ can be the same or different and are hydrogen, methyl, or ethyl.

It also will be understood that the compounds within the scope of Formula 1, having a basic amino group, readily form acid addition salts and such salts having a non-toxic anion are also included within the scope of the present invention. Representative of such salts are the hydrochlorides, hydrobromides, sulfates, phosphates, acetates, succinates, adipates, propionates, tartrates, citrates, bicarbonates, pamoates, cyclohexylsulfamates, and acetylsalicylates. Of these, the hydrochlorides, acetates and cyclohexylsulfamates are preferred. The cyclohexylsulfamates have a pleasant taste and thus are particularly useful in preparing syrups for oral administration. Additionally, the cyclohexylsulfamates have usefulness in making uncoated tablets for oral administration which have no objectionable bitter taste. Other salts include those with caprochlorone and with penicillin. The salts enhance the usefulness of the relatively insoluble amines in pharmaceutical applications.

Compounds of the above Formula 1 are preferred where R is alkyl and in particular where R is alkyl of 1 through 2 carbons, especially methyl. A broad range of antiviral activity is noted in this class of compounds.

Particularly preferred are the hydrochlorides of the following compounds:

1-amino-4-methylbicyclo[2.2.2]oct-2-ene
1-(N-methylamino)-4-methylbicyclo[2.2.2]oct-2-ene
1-(N,N-dimethylamino)-4-methylbicyclo[2.2.2]oct-2-ene
1-(N-ethylamino)-4-methylbicyclo[2.2.2]oct-2-ene
α,4-dimethylbicyclo[2.2.2]oct-2-ene-1-methylamine
N,4-dimethylbicyclo[2.2.2]oct-2-ene-methylamine
N,N,4-trimethylbicyclo[2.2.2]oct-2-ene-1-methylamine
4-methylbicyclo[2.2.2]oct-2-ene-1-methylamine
N-methylbicyclo[2.2.2]oct-2-ene-1-methylamine
N,N-dimethylbicyclo[2.2.2]oct-2-ene-1-methylamine
α,α,4-trimethylbicyclo[2.2.2]oct-2-ene-1-methylamine The above compounds can be prepared by a variety of methods.

Preparation of 1-aminobicyclooct-2-enes and bicyclooct-2-ene-1-methylamines

If it is desired to have as the R substituent an alkyl group, 1-amino-4-alkylbicyclo[2.2.2]oct-2-enes can be obtained by reaction of ethylene with the appropriately substituted 4-alkylcyclohexa-1,3-diene carboxylic acid, to give the 4-alkylbicyclo-[2.2.2]oct-2-ene-1-carboxylic acid. This is converted to the 1-amino-4-alkylbicyclo[2.2.2]oct-2-ene by a modified Curtius technique [J. Org. Chem., 26, 3511 (1961)]. In this manner, for example, dihydrohumic acid (4-isopropylcyclohexa-1,3-diene carboxylic acid) is used in the preparation of 1-amino-4-isopropyl-bicyclo[2.2.2]-oct-2-ene.

As a suitable alternate to this sequence, alkyl esters of 6-alkyl-α-pyrone-3-carboxylic acid react with ethylene to give 4 - alkylbicyclo[2.2.2]oct - 2-ene-1-carboxylic acid alkyl esters, which are hydrolyzed with alkali to give 4-alkylbicyclo[2.2.2]oct-2-ene-carboxylic acids. These versatile intermediates may either be converted to the 1-amino-4-alkylbicyclo[2.2.2]oct-2-enes by the modified Curtius reaction, as above, or they may be converted to the 4-alkylbicyclo[2.2.2]oct-2-ene-1-carboxylic acid chlorides with thionyl chloride, and then to the 4-alkyl-bicyclo[2.2.2]oct-2-ene-1-carboxamides by reaction with ammonia. The latter can be reduced with lithium aluminum hydride to give 4 - alkylbicyclo[2.2.2]oct - 2-ene-1-methylamines. By starting with alkyl esters of α-pyrone-3-carboxylic acid in this sequence, 1-aminobicyclo[2.2.2] oct-2-ene and bicyclo[2.2.2]oct-2 - ene-1 - methylamine, where R is hydrogen, are easily prepared.

The α-alkylbicyclo[2.2.2]oct-2-ene-1-methylamines are prepared by reduction of bicyclo[2.2.2]oct-2-eneyl-(1) alkyl ketone oximes with lithium aluminum hydride or by reductive amination. The ketones from which these oximes are derived are conveniently made by the reaction of the appropriate dialkyl cadmium or alkyl lithium with a bicyclo[2.2.2]oct-2-ene-1-carboxylic acid chloride.

The α,α-dialkylbicyclo[2.2.2]oct-2-ene-1-methylamines are prepared by the reaction of α,α-dialkylbicyclo[2.2.2]-oct-2-ene-1-methylmagnesium halides with O-methylhydroxylamine, followed by water hydrolysis. The Grignard reagents are prepared from the reaction of α,α-dialkyl-bicyclo[2.2.2]oct-2-ene-1-methyl halides with magnesium metal in ether, the halides being obtained from the action of hydrogen halides on the corresponding alcohols. The alcohols are obtained by the reaction of methyl- or ethylmagnesium halides on bicyclo[2.2.2]oct-2-ene-1-carboxylic acid esters or bicyclo-[2.2.2]oct-2-enyl (1) alkyl ketones, depending on whether the α,α-dialkyl groups are desired to be the same or different.

One or both of the hydrogens of the 1-amino nitrogen of 1-aminobicyclo[2.2.2]oct-2-ene, the 4-alkyl-1-aminobicyclo[2.2.2]oct-2-enes, bicyclo[2.2.2]oct-2-ene-1- methylamine, the 4-alkylbicyclo[2.2.2]oct-2-ene-1-methylamines, the α,4-dialkylbicyclo[2.2.2]oct-2-ene-1-methylamines, or the α,α,4-trialkylbicyclo - [2.2.2]oct-2-ene-1-methylamines can be replaced by methyl or ethyl. This is most conveniently done by formylation or acetylation to give an 1-acylaminobicyclo[2.2.2]oct-2-ene, which is then reduced to the 1-(N-alkylamino)bicyclo[2.2.2]oct-2-ene with lithium aluminum hydride. The N-alkylamino compounds can be acylated again and reduced to give the 1-N,N-dialkylamino compounds.

While the N-alkylated bicyclo[2.2.2]oct-2-ene-1-methylamines and 4-alkylbicyclo[2.2.2]oct - 2-ene - 1-methylamines can be prepared by the method of acylation and reduction, the best and simplest method is to prepare the appropriate bicyclo[2.2.2]oct-2-ene-1-carboxamide from the bicyclo[2.2.2]oct-2-ene-1-carboxylic acid chloride and the properly substituted amine, and reduce it to the desired N-alkylated or N,N-dialkylated compound. For example, reaction of bicyclo[2.2.2]oct-2-ene-1-carboxylic acid chloride with methylamine gives N-methylbicyclo[2.2.2]oct-2-ene-1-carboxamide. Reduction of this compound with lithium aluminum hydride gives N-methylbicyclo[2.2.2]oct-2-ene-1-methylamine.

The primary amines of this invention, where $R_1$ and $R_2$ of Formula 1 are hydrogen, and secondary amines, where at least one of $R_1$ and $R_2$ of Formula 1 is hydrogen, are useful in controlling the molecular weight of polyamide preparations. Thus, when a measured small proportion of one of these primary or secondary amines is heated with the salt prepared from a diamine and a dicarboxylic acid, reaction leads to a polyamide of a limited molecular weight range having oxidation-resistant end groups (e.g.

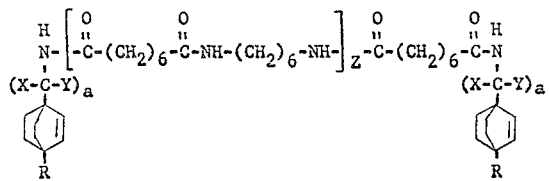

where the value of Z is variable depending on the molar concentration of the amine in the mixture).

The primary, secondary and tertiary amines of this invention and their salts are useful in small amounts as corrosion inhibitors and as adjuvants in metal plating baths.

The following, as well as their non-toxic salts, are representative of the compounds of this invention:

1-aminobicyclo[2.2.2]oct-2-ene
1-(N-methylamino)bicyclo[2.2.2]oct-2-ene
1-(N,N-dimethylamino)bicyclo[2.2.2]oct-2-ene
1-(N-ethyl-N-methylamino)bicyclo[2.2.2]oct-2-ene
1-(N,N-diethylamino)bicyclo[2.2.2]oct-2-ene
1-amino-4-methylbicyclo[2.2.2]oct-2-ene
1-amino-4-ethylbicyclo[2.2.2]oct-2-ene
1-amino-4-propylbicyclo[2.2.2]oct-2-ene
1-amino-4-isopropylbicyclo[2.2.2]oct-2-ene
1-amino-4-butylbicyclo[2.2.2]oct-2-ene
1-amino-4-sec-butylbicyclo[2.2.2]oct-2-ene
1-amino-4-isobutylbicyclo[2.2.2]oct-2-ene
1-amino-4-tert-butylbicyclo[2.2.2]oct-2-ene
bicyclo[2.2.2]oct-2-ene-1-methylamine
α-methylbicyclo[2.2.2]oct-2-ene-1-methylamine
α,α-dimethylbicyclo[2.2.2]oct-2-ene-1-methylamine
α-ethylbicyclo[2.2.2]oct-2-ene-1-methylamine
α,α-diethylbicyclo[2.2.2]oct-2-ene-1-methylamine
α-ethyl-α-methylbicyclo[2.2.2]oct-2-ene-1-methylamine
N,α-dimethylbicyclo[2.2.2]oct-2-ene-1-methylamine
N,α,α-trimethylbicyclo[2.2.2]oct-2-ene-1-methylamine
N,N,α,α-tetramethylbicyclo[2.2.2]oct-2-ene-1-methylamine
N,N,α,α,4-pentamethylbicyclo[2.2.2]oct-2-ene-1-methylamine This invention will be better understood by reference to the following illustrative examples.

Example 1

A solution of 5.3 g. of ethyl α-pyrone-3-carboxylate [J. Org. Chem., 28, 1443 (1963)] in 25 ml. of hexane was heated at 180° C. under an ethylene pressure of 3000 atm. for 17 hours in a pressure vessel. The mixture was cooled, and the bomb contents were removed. Solvent was distilled from the product at reduced pressure, and 50 ml. of methanol was added to the residue to precipitate polymeric materials. The solution was filtered, and the filtrate was distilled under reduced pressure to give 2.73 g., 48%, of bicyclo[2.2.2]oct-2-ene-1-carboxylic acid, ethyl ester.

Table I gives results when other pyrone starting materials were used in this procedure. Ethyl 6-tert-butyl-α-pyrone-3-carboxylate shown in the table was prepared in the following manner:

To a stirred mixture of 12 g. (0.5 mole) of sodium hydride in 350 ml. of ethylene glycol dimethyl ether was added a mixture of 50 g. (0.5 mole) of pinacolone and 108 g. (0.5 mole) of diethyl ethoxymethylenemalonate dropwise over a period of 30 minutes. The mixture was refluxed with stirring for 3 hours, then cooled to room temperature. The excess sodium hydride was destroyed with ethanol, and the reaction mixture was poured into a stirred solution of 116 ml. (120 g., 2 moles) of glacial acetic acid in 500 ml. of ice-water. This was extracted with ether, the ether extracts were washed with saturated aqueous sodium chloride solution, and they were dried with anhydrous magnesium sulfate. Removal of the ether at reduced pressure gave 132.28 g. of an oil, which on distillation gave 59.13 g., (52%) of ethyl 6-tert-butyl-α-pyrone-3-carboxylate as a yellow oil, B.P. 125° C. at 0.25 mm.; B.P. 130° C. at 0.5 mm.; B.P. 145° C. at 0.8 mm.; B.P. 148° C. at 1.0 mm. The other pyrone starting materials shown in Table I were prepared by the method described in J. Gen. Chem. USSR, 28, 1562, 2438 (1958).

An 30.75-g. (0.1583-mole) amount of 4-propylbicyclo-[2.2.2]oct-2-ene-1-carboxylic acid, ethyl ester was refluxed with 500 ml. (1 mole) of 2 N sodium hydroxide for 33 hours. The reaction mixture was cooled to room temperature and the colorless crystals were filtered and washed with ether. The solid was suspended in water, and 166.6 ml. (2 moles) of 12 N hydrochloric acid was added with cooling and stirring. The product was extracted with ether, the ether extract was washed with water, and, after drying, the ether was removed by evaporation in a vacuum to afford 25.51 g. (83%) of 4-propylbicyclo[2.2.2]oct-2-ene-1-carboxylic acid as colorless crystals, M.P. 173–175.5° C. Recrystallization from heptane gave a sample for analysis, M.P. 177–178.5° C.

Analysis.—Calcd. for $C_{12}H_{18}O_2$: C, 74.3; H, 9.28. Found: C, 74.3; H, 9.22.

Table II gives results when other 4-alkylbicyclo[2.2.2]oct-2-ene-1-carboxylic acid esters were used in this procedure.

To a solution of 6 g. (0.0309 mole) of 4-propylbicyclo-[2.2.2]oct-2-ene-1-carboxylic acid dissolved in a minimum amount of aqueous acetone at 0° C. was added a solution of 5.02 ml. (3.63 g., 0.0359 mole) of triethylamine in 87.5 ml. of acetone. A solution of 3.77 ml. (4.29 g., 0.0395 mole) of ethyl chloroformate in 22.5 ml. of acetone was added to the stirred reaction mixture at 0° C. over a 5-min. period. The reaction mixture was stirred at 0° C. for 30 min., and then a solution of 3.04 g. (0.0467 mole) of sodium azide in 15 ml. of water was added dropwise over a period of 10 minutes. Stirring at 0° C. was continued for 1 hour, and then the

TABLE I

| Pyrone | Solvent | Time, hr. | Temp., °C. | Product | Physical Constants |
|---|---|---|---|---|---|
| Ethyl 6-methyl α-pyrone-3-carboxylate | Benzene | 10 | 180 | 4-methylbicyclo[2.2.2]-oct-2-ene-1-carboxylic acid, ethyl ester. | B.P. 82° C./3.8 mm. $n_D^{25}$ |
| Ethyl 6-ethyl α-pyrone-3-carboxylate | do | 14 | 180 | 4-ethylbicyclo[2.2.2]-oct-2-ene-1-carboxylic acid, ethyl ester. | B.P. 120-130° C./13 mm. |
| Ethyl 6-propyl α-pyrone-3-carboxylate | do | 13 | 180 | 4-propylbicyclo[2.2.2]-oct-2-ene-1-carboxylic acid, ethyl ester (67% yield). | B.P. 112° C./2.2 mm. |
| Ethyl α-tert-butyl α-pyrone-3-carboxylate. | None | 14.5 | 180 | 4-tert-Butylbicyclo-[2.2.2]oct-2-ene-1-carboxylic acid, ethyl ester (91% yield). | After solvent removal, the crude material was used in the next step. |

TABLE II

| Starting Material | Product | Physical Constants and Analysis |
|---|---|---|
| Bicyclo[2.2.2]oct-2-ene-1-carboxylic acid, ethyl ester. | Bicyclo[2.2.2]oct-2-ene-1-carboxylic acid. | |
| 4-methylbicyclo[2.2.2]oct-2-ene-1-carboxylic acid, ethyl ester. | 4-methylbicyclo[2.2.2]oct-2-ene-1-carboxylic acid. | M.P. 143–144° C. Calcd. for $C_{10}H_{14}O_2$: C, 72.2; H, 8.14. Found: C, 72.40; H, 8.41. |
| 4-tert-butylbicyclo[2.2.2]oct-2-ene-1-carboxylic acid, ethyl ester. | 4-tert-butylbicyclo[2.2.2]oct-2-ene-1-carboxylic acid. | M.P. 252.2–253.5° C. Calcd. for $C_{13}H_{20}O_2$: C, 75.0; H, 9.62. Found: C, 75.0; H, 9.61. | reaction mixture was poured into ice water and the product was extracted with ether. The ether extract was dried with anhydrous magnesium sulfate and the ether was removed by vacuum evaporation to yield 6.0 g. of the carboxylic acid azide as a pink oil. This was dissolved in 25 ml. of toluene and heated at reflux for 30 min., after which time nitrogen evolution had ceased. Evaporation of the toluene in a vacuum gave the isocyanate. This was refluxed with 45 ml. of 6 N aqueous hydrochloric acid overnight. Cooling the acid solution gave 1.85 g. (29%) of 4-propylbicyclo[2.2.2]oct-2-ene-1-amine hydrochloride as colorless crystals, M.P. 273–275° C.

*Analysis.*—Calcd. for $C_{11}H_{20}N \cdot HCl$: C, 65.5; H, 9.93; N, 6.95. Found: C, 65.24; H, 9.87; N, 7.43.

Table III gives results when other 4-alkylbicyclo[2.2.2]oct-2-ene-1-carboxylic acids were used in this procedure.

Example 2

To a stirred solution at 0° C. of 2.47 g. (0.0149 mole) of 4-methylbicyclo[2.2.2]oct-2-ene-1-carboxylic acid and 2.42 ml. (1.75 g., 0.0173 mole) of triethylamine in 70 ml. of chloroform was added 1.82 ml. (2.07 g., 0.0190 mole) of ethyl chloroformate over a period of 5 minutes. Stirring at 0° C. was continued for 30 min. Then ammonia was bubbled into the reaction mixture for 10 min. while maintaining a temperature of −10° C. to 0° C. The solids were filtered, and the filtrate was concentrated in a vacuum to yield 1.88 g. (76%) of 4-methylbicyclo-[2.2.2]oct-2-ene-1-carboxamide. This compound, 1.88 g., (0.114 mole), was placed in the cup of a Sohxlet extractor and 1.56 g. (0.0405 mole) of lithium aluminum hydride was charged to 150 ml. of ether in the flask. The apparatus was operated overnight, then allowed to cool to room temperature. The excess lithium aluminum hydride was destroyed by the addition of 3.32 ml. of water, with stirring. After stirring 1 hour, the mixture was filtered, and the solids were washed with ether. The ether filtrate and washings were combined, dried with potassium hydroxide pellets and then with anhydrous magnesium sulfate, and gassed with hydrogen chloride until precipitation was complete. The precipitate was filtered and dried, and amounted to 1.24 g. (44%) of 4-methylbicyclo[2.2.2]oct-2-ene-1-methylamine hydrochloride.

*Analysis.*—Calcd. for $C_{10}H_{17}N \cdot HCl$: Cl, 18.9; N, 7.48. Found: Cl, 18.97; N, 7.58.

Example 3

Using the same molar ratios of reagents as in the preceding example in the procedure of that example, 3.1 g. (0.0149 mole) of 4-tert-butylbicyclo[2.2.2]oct-2-ene-1-carboxylic acid gave 5.34 g. (100% yield) of 4-tert-butylbicyclo[2.2.2]oct-2-ene-1-carboxamide. The amide (0.0149 mole) gave 1.32 g. (38%) of 4-tert-butylbicyclo-[2.2.2]oct-2-ene-1-methylamine hydrochloride, a colorless solid.

*Analysis.*—Calcd. for $C_{13}H_{23}N \cdot HCl$: Cl, 15.45; N, 6.1. Found: Cl, 15.17; N, 6.32.

Example 4

A solution of 0.10 mole of 4-methylbicyclo[2.2.2]oct-2-ene-1-amine in 75 milliliters of dry pyridine is stirred while 0.10 mole of acetyl chloride is added dropwise at such a rate that the temperature does not exceed 50° C. The mixture is then refluxed for ½ hour, cooled, and poured into 500 milliliters of cold water. The resulting precipitate is filtered, washed well with water, and dried to give 1-acetamido-4-methyl-bicyclo[2.2.2]oct-2-ene.

TABLE III

| Starting Material | Product | Physical Constants and Analysis |
|---|---|---|
| Bicyclo[2.2.2]oct-2-ene-1-carboxylic acid. | Bicyclo[2.2.2]oct-2-ene-1-amine hydrochloride. | Calcd. for $C_8H_{13}N \cdot HCl$: C, 60.18; H, 8.84; N, 8.78. Found: C, 59.83; H, 9.08; N, 8.61. M.P. 315.5–316.8° C. n.m.r. spectrum—multiplet at $\tau=4.0$ (two vinyl H), multiplet at $\tau=7.6$ (bridgehead H) and broad peak at $\tau=8.6$ (four $CH_2$ and $NH_2$). |
| 4-methylbicyclo[2.2.2]oct-2-ene-1-carboxylic acid. | 4-methylbicyclo[2.2.2]oct-2-ene-1-amine. | B.P. 73–74° C./80 mm.; $n_D^{25}$ 1.4868. Calcd. for $C_9H_{15}N$: C, 78.77; H, 11.02; N, 10.21. Found: C, 79.06; H, 11.07; N, 10.14, 10.47. n.m.r. spectrum—quartet at $\tau=4.1$ (two vinyl hydrogens), multiplet at $\tau=8.6$ (8 $CH_2$ hydrogens) and sharp peaks at $\tau=8.58$ (two $NH_2$ hydrogens) and $\tau=8.93$ (3 methyl hydrogens). |
| 4-tert-butylbicyclo[2.2.2]oct-2-ene-1-carboxylic acid. | 4-tert-butylbicyclo[2.2.2]oct-2-ene-1-amine hydrochloride. | Calcd. for $C_{12}H_{21}H \cdot NCl$: C, 66.8; H, 10.2; N, 6.5. Found: C, 67.06; H, 10.17; N, 6.5. |

A 250-milliliter flask with reflux condenser, drying tube and stirrer is charged with 0.10 mole of 1-acetamido-4-methylbicyclo[2.2.2]oct-2-ene, 100 milliliters of diethylene glycol dimethyl ether, and 5.7 grams (0.15 mole) of lithium aluminum hydride. The mixture is heated in an oil bath for 8 hours, at 60° C. and finally for 2 hours at 120° C. After cooling, the reaction mixture is treated with water to decompose the excess lithium aluminum hydride. The insoluble aluminum compounds are dissolved by adding a 20% solution of sodium potassium tartrate. The mixture is extracted with ether, the ether extract is dried with anhydrous potassium carbonate, and the ether is removed by vacuum evaporation. The residue is suspended in 50 milliliters of water, taken to pH 2 with concentrated hydrochloric acid, and the resulting solution is extracted with ether to remove any traces of unreacted starting material. The raffinate is vacuum-concentrated to yield solid 1-(N-ethylamino)-4-methylbicyclo[2.2.2]oct-2-ene hydrochloride.

Example 5

A solution of 0.10 mole of 1-(N-ethylamino)bicyclo-[2.2.2]oct-2-ene in 46.3 grams (1.0 mole) of 98–100% formic acid is allowed to stand 18 hours at room temperature, and the mixture is vacuum-evaporated. The residue consists of 1-(N-ethylformamido)bicyclo[2.2.2]oct-2-ene.

1 - (N - ethylformamido)bicyclo[2.2.2]oct-2-ene is reduced to 1-(N-ethyl-N-methyl-amino)bicyclo[2.2.2]oct-2-ene with lithium aluminum hydride by substituting this compound for 1-acetamide-4-methylbicyclo[2.2.2]oct-2-ene in the procedure of Example 4, using an 0.10 mole quantity.

Example 6

A mixture of 5.26 g. of 1-amino-4-ethylbicyclo[2.2.2]oct-2-ene, 8 ml. of 98% formic acid and 5 ml. of 37% aqueous formaldehyde is heated at reflux on a steam bath for 15 hours. After cooling, the mixture is made basic with sodium hydroxide solution, is extracted with ether, and the extract dried over anhydrous potassium carbonate. Dry hydrogen chloride is passed into the dried extract until precipitation is complete, and the precipitate is filtered and dried. This precipitate is 1-(N,N-dimethylamino)-4-ethylbicyclo[2.2.2]oct-2-ene hydrochloride.

Example 7

A mixture of 3.6 g. of magnesium turnings, a small crystal of iodine, 11 ml. of anhydrous benzene and 1 ml. of absolute ethanol is heated until a reaction begins. Then heating is discontinued and a mixture of 24.0 g. of diethyl malonate, 7.0 g. of absolute ethanol and 30 ml. of benzene is added dropwise at a rate which causes the reaction mixture to reflux. After addition is completed, the mixture is heated at reflux until the magnesium has dissolved. The excess ethanol is removed by azeotropic distillation with some of the benzene. To the resultant solution of ethoxymagnesiumdiethylmalonate is added a solution of 18.5 g. of 4-methylbicyclo[2.2.2]oct-2-ene-1-carboxylic acid chloride in 30 ml. of anhydrous benzene, dropwise, over a 50-minute period. The reaction mixture is refluxed for an additional hour, and then cooled in an ice bath. To the cold mixture is added 50 g. of ice followed by sufficient 10% sulfuric acid to cause two clear layers to appear. The layers are separated and the aqueous layer is extracted with two 25-ml. portions of benzene. The extracts are combined with the organic layer, washed with 30 ml. of water, and dried with anhydrous sodium sulfate. The benzene is removed by vacuum concentration at 40°. A solution of 64 ml. of glacial acetic acid, 39 ml. of water and 7 ml. of concentrated sulfuric acid is added to the residue (32 g.), and the mixture is heated at reflux for 7 hours. Then it is cooled and poured into 350 ml. of water. The mixture is extracted with two 50-ml. portions of ether, which are combined, dried with anhydrous magnesium sulfate, and vacuum concentrated to yield 4-methylbicyclo[2.2.2]oct-2-enyl-(1) methyl ketone.

A mixture of 14 g. of hydroxylamine hydrochloride, 65 ml. of anhydrous pyridine and 65 ml. of anhydrous ethanol is heated on a steam bath until a clear solution is obtained. To this is added 12.5 g. of 4-methylbicyclo-[2.2.2]oct-2-enyl-(1) methyl ketone and the mixture is heated at reflux for 2 hours, then cooled. It is concentrated to dryness in a vacuum at 70°, and the residue is suspended in 150 ml. of water and stirred well. The solids are filtered and dried to yield 4-methylbicyclo[2.2.2]oct-2-enyl-(1) methyl ketone oxime.

A 7.8-g. amount of 4-methylbicyclo[2.2.2]oct-2-enyl-(1) methyl ketone oxime is added to a mixture of 3.3 g. of lithium aluminum hydride in 150 ml. of anhydrous tetrahydrofuran, and the mixture is stirred and heated at reflux for 3 hours. It is cooled in an ice bath and the excess of lithium aluminum hydride is destroyed with a water-tetrahydrofuran mixture. Several ml. of 10% sodium hydroxide solution is added to aid in the coagulation of the solids, which are removed by filtration, washed with 50 ml. of chloroform, and discarded. The filtrate, which includes the tetrahydrofuran solution and the chloroform solution, is saturated with dry hydrogen chloride and then concentrated to dryness in a vacuum at 50° C. The residue is placed in a separatory funnel and shaken with a mixture of 100 ml. of 10% sodium hydroxide and 300 ml. of ether. The aqueous layer is discarded and the ether solution is dried over potassium hydroxide pellets. Dry hydrogen chloride is passed into the ether solution until precipitation is complete, and the resultant amine hydrochloride is filtered and dried. This crude salt is dissolved in water, treated with excess 50% sodium hydroxide solution, and the free amine is extracted with ether. The ether extract is dried over potassium hydroxide pellets, decanted, and hydrogen chloride is passed in until precipitation is complete. The precipitate is filtered and dried to yield $\alpha$,4-dimethylbicyclo[2.2.2]oct-2-ene-1-methylamine hydrochloride.

Example 8

4-methylbicyclo[2.2.2]oct - 2 - ene - 1 - carboxylic acid, ethyl ester (0.15 mole) is dissolved in 100 ml. of diethyl ether. A solution of methylmagnesium bromide (0.20 mole) in 67 ml. of ether is added to the ester at a rate which causes gentle refluxing to occur. The reaction mixture is refluxed for an additional hour after the addition is complete. The magnesium complexes in the reaction mixture are destroyed by the addition of 25 ml. of a saturated ammonium chloride solution. The resultant solid is removed by filtration and the filtrate is concentrated to dryness. The residue is $\alpha,\alpha$,4-trimethylbicyclo[2.2.2]oct-2-ene-1-methanol.

$\alpha,\alpha$,4-trimethylbicyclo[2.2.2]oct-2-ene-1-methanol (0.1 mole) is dissolved in carbon tetrachloride and cooled to 0° C. A slow stream of hydrogen bromide is passed through the solution for 24 hours. The aqueous phase is separated and the carbon tetrachloride solution is stored over anhydrous potassium carbonate for 1 week. The solid is removed by filtration and the carbon tetrachloride is removed by distillation. The residue is distilled under reduced pressure and the $\alpha,\alpha$,4-trimethylbicyclo[2.2.2]oct-2-ene-1-methyl bromide fraction is collected.

Metallic magnesium (0.1 mole) is placed in a dry flask and enough anhydrous ether is added to the flask to cover the magnesium. A slow stream of dry nitrogen is passed over the ether. The flask is provided with a potassium hydroxide-filled drying tube to protect the reaction from $CO_2$ and moisture. $\alpha,\alpha$,4 - trimethylbicyclo[2.2.2]oct - 2-ene-1-methyl bromide (1 g.) is added to the ether-magnesium mixture together with a small crystal of iodine and the flask is warmed until a reaction begins (indicated by the ether taking on a milky appearance). $\alpha,\alpha$,4-trimethylbicyclo[2.2.2]oct-2-ene-1-methyl bromide (0.1 mole) dissolved in 200 ml. of anhydrous diethyl ether is added to the flask at a rate which causes the ether to reflux gently. After the addition is complete, the reaction is refluxed for an additional hour. Then it is cooled to −10° C. A solution of O-methylhydroxylamine (0.05 mole) (Ber., 1920, 53, 1477) in 10 ml. of anhydrous ether is slowly added to the bicyclooctene methylmagnesium bromide keeping the temperature at −10° C. After the addition is complete, the temperature is kept at −10° C. for 0.5 hour. The reaction mixture is refluxed for 2 hours, then cooled to 0° and acidified with 5 N hydrochloric acid. The aqueous layer is separated and made basic with 50% sodium hydroxide. The base-treated aqueous mixture is extracted with ether, and the ether solution is dried over potassium hydroxide pellets and separated. α,α,4 - trimethylbicyclo [2.2.2]oct-2-ene-1-methylamine is obtained by concentrating the ether solution to dryness. The amine hydrochloride is obtained by passing anhydrous hydrogen chloride gas into the dry ether solution and collecting the resultant solid by filtration.

Example 9

To a mixture of 1.5 g. of lithium aluminum hydride in 100 ml. of anhydrous diethylene glycol, dimethyl ether is added 4.0 g. of N - acetyl - α,α - dimethylbicyclo[2.2.2] oct-2-ene-1-methylamine. The reaction mixture is stirred and heated at reflux for 3 hours, then cooled in an ice bath. The excess lithium aluminum hydride is decomposed by adding wet diethylene glycol, dimethyl ether. Several ml. of 10% sodium hydroxide is added to coagulate the precipitate, which is then filtered and washed with 50 ml. of ether. The filtrate is treated with dry hydrogen chloride until no additional precipitate forms. This is filtered, dissolved in 100 ml. of water, and an excess of 50% sodium hydroxide is added. The mixture is extracted with three 30-ml. portions of ether, and the ether extracts are combined, dried with potassium hydroxide pellets, and treated with hydrogen chloride until precipitation is complete. This precipitate is filtered and dried to yield N-ethyl-α,α-dimethyl - 1 - bicyclo[2.2.2]oct - 2 - ene - 1 - methylamine hydrochloride.

Example 10

A mixture of 0.10 mole of 1 - aminobicyclo[2.2.2] oct-2-ene and 9.87 grams (0.10 mole) of 38% hydrochloric acid in 100 milliliters of water is concentrated in vacuo at 60° C. The resulting salt, 1-aminobicyclo[2.2.2]octane hydrochloride, is dried in vacuo at 60° C.

Examples 11–16

Example 10 is repeated substituting the following indicated reactants for those of that example, to obtain the indicated product.

milliliters of ethyl ether until precipitation is complete. The precipitate is filtered and dried in a vacuum to give 1 - amino - 4 - methylbicyclo[2.2.2]oct - 2 - ene bicarbonate.

The preceding examples can be repeated substituting equivalent amounts of appropriate starting materials to obtain other compounds of this invention including those listed hereinbefore.

The compounds of Formula 1 above can be administered in the antiviral treatment according to this invention by any means that effects contact of the active ingredient compound with the site of virus infection in the body of a warm-blooded animal. It will be understood that this includes the site prior to infection setting in as well as after. For example, administration can be parenterally, that is subcutaneously, intravenously, intramuscularly, or intraperitoneally. Alternatively or concurrently, the compounds are effective on administration by the oral route. Since they are particularly effective against respiratory infections such as viral influenza and viral pneumonia, administration can be by vapor or spray through the mouth or nasal passages.

The compounds within the scope of this invention are valuable for viral prophylaxis, as well as for therapeutic treatment.

The dosage administered will be dependent upon the virus being treated, the age, health and weight of the recipient, the extent of infection, kind of concurrent treatment if any, frequency of treatment, and the nature of the effect desired. Generally, a daily dosage of active ingredient compound will be from about 0.1 to 25 milligrams per kilogram of body weight, although lower, such as 0.5 milligram per kilogram, or higher amounts can be used. Ordinarily, from 0.25 to 15 and preferably 0.5 to 10 milligrams per kilogram per day, in one or more applications per day, is effective to obtain the desired result.

The active ingredient of Formula 1 can be employed in useful compositions according to the present invention in such dosage forms as tablets, capsules, powder packets, or liquid solutions, suspensions, or elixirs, for oral administration or liquid solutions for parenteral use, and in certain cases suspensions for parenteral use (except intravenous). In such compositions the active ingredient will ordinarily always be present in an amount of at least 0.5% by weight based on the total weight of the composition and not more than 90% by weight.

Besides the active ingredient of Formula 1 the antiviral composition will contain a solid or liquid nontoxic pharmaceutical carrier for the active ingredient.

In one embodiment of a pharmaceutical composition of this invention, the solid carrier is a capsule which can

| Example No. | Reactant | Acid | Product |
| --- | --- | --- | --- |
| 11 | 1-amino-4-methylbicyclo[2.2.2]oct-2-ene (0.10 mole). | 85% phosphoric acid (0.033 mole) | 1-amino-4-methylbicyclo[2.2.2]oct-2-ene, phosphate. |
| 12 | 1-(N-methylamino)-bicyclo[2.2.2]oct-2-ene (0.10 mole). | Sulfuric acid (0.050 mole) | 1-(N-methylamino)-bicyclo[2.2.2]oct-2-ene, sulfate. |
| 13 | 1-(N,N-dimethylamino)bicyclo[2.2.2]oct-2-ene (0.10 mole). | Tartaric acid (0.10 mole) | 1-(N,N-dimethylamino)bicyclo[2.2.2]oct-2-ene, bitartrate. |
| 14 | α-Methylbicyclo[2.2.2]oct-2-ene-1-methylamine (0.10 mole). | Tartaric acid (0.050 mole) | α-Methylbicyclo[2.2.2]oct-2-ene-1-methylamine, tartrate. |
| 15 | α,4-dimethylbicyclo[2.2.2]oct-2-ene-1-methylamine (0.10 mole). | Maleic acid (0.050 mole) | α,4-dimethylbicyclo[2.2.2]oct-2-ene-1-methylamine, maleate. |
| 16 | N,N,α,α,4-pentamethylbicyclo[2.2.2]oct-2-ene-1-methylamine (0.10 mole). | Acetic acid (0.10 mole) | N,N,α,α,4-pentamethylbicyclo[2.2.2]oct-2-ene-1-methylamine, acetate. |

Example 17

A solution of 0.20 mole of 1-aminobicyclo[2.2.2]oct-2-ene hydrochloride in 100 milliliters of water is added to a solution of 0.10 mole of pamoic acid, disodium salt [4,4' - methylene - bis(3 - hydroxy - 2 - naphthoic acid), disodium salt] in 500 milliliters of water. The resulting precipitate is filtered, washed well with water, and dried in a vacuum to give 1 - aminobicyclo[2.2.2]oct - 2 - ene pamoate.

Example 18

Carbon dioxide is passed into a solution of 0.10 mole of 1-amino - 4 - methylbicyclo[2.2.2]oct - 2 - ene in 100 be of the ordinary gelatin type. In the capsule will be from about 30–60% by weight of a compound of Formula 1 and 70–40% of a carrier. In another embodiment, the active ingredient is tableted with or without adjuvants. In yet another embodiment, the active ingredient is put into powder packets and employed. The active ingredient of the capsules, tablets and powders will generally constitute from about 5% to 95% and preferably from 25% to 90% by weight. These dosage forms preferably contain from about 5 to about 500 milligrams of active ingredient, with from about 25 to about 250 most preferred.

The pharmaceutical carrier can, as previously indicated, be a sterile liquid such as water and oils, including those of petroleum, animal, vegetable or synthetic origin, for example peanut oil, soybean oil, mineral oil, sesame oil, and the like. In general, water, saline, aqueous dextrose (glucose) and related sugar solutions and glycols such as propylene glycol or polyethylene glycols are preferred liquid carriers, particularly for injectible solutions. Sterile injectable solutions such as saline will ordinarily contain from about 0.5% to 25%, and preferably about 1 to 10% by weight of the active ingredient.

As mentioned above, oral administration can be in a suitable suspension or syrup, in which the active ingredient ordinarily will constitute from about 0.5 to 10% and preferably about 2 to 5%, by weight. The pharmaceutical carrier in such composition can be a watery vehicle such as an aromatic water, a syrup or a pharmaceutical mucilage.

Suitable pharmaceutical carriers are described in "Remington's Practice of Pharmacy" by E. W. Martin and E. F. Cook, as well known reference text in this field.

In addition to the exemplary illustrations above, the following examples further explain the present invention:

Example 19

A large number of unit capsules are prepared by filling standard two-piece hard gelatin capsules weighing about 50 milligrams each with 50 milligrams of powdered 1 - amino - 4 - methylbicyclo[2.2.2]oct - 2 - ene, by hydrochloride, 125 milligrams of lactose and 1 milligram of "Cab-o-sil."

Example 20

Example 19 is repeated except that soft gelatin capsules are used and powdered 1 - amino - 4 - methylbicyclo [2.2.2]oct-2-ene (free bases is first dissolved in mineral oil.

Example 21

Example 19 is repeated except that the dosage unit is 50 milligrams of active ingredient, 5 milligrams of gelatin, 1.5 milligrams of magnesium stearate and 100 milligrams of lactose, mixed and formed into a tablet by a conventional tableting machine. Slow release pills or tablets can also be used, by applying appropriate coatings. A sugar coating may be applied to increase palatability.

Example 22

A parenteral composition suitable for administration by injection is prepared by stirring 5% by weight of the active ingredient of Example 19 in sterile aqueous 0.9% saline.

A large variety of compositions according to this invention can thus readily be made by substituting other compounds of this invention, and including specifically but not limited to compounds of this invention that have specifically been named hereinbefore. The compounds will be used in the amounts indicated in accordance with procedures well known and described in the Martin and Cook text mentioned above.

The disclosure herein should not be taken as a recommendation to use the disclosed invention in any way without full compliance with U.S. Food and Drug laws and other laws and governmental regulations which may be applicable.

The above and similar examples can be carried out in accordance with the teachings of this invention, as will be readily understood by persons skilled in the art, by substitution of components and amounts in place of those specified. Thus, the foregoing detailed description has been given for clearness of understanding only and no unnecessary limitations are to be understood therefrom.

The invention claimed is:

1. A compound selected from the group consisting of
   (a) compounds of the formula

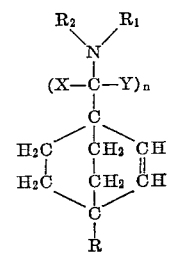

where
   $n$ is an integer of 0 to 1;
   R is selected from the group consisting of hydrogen and alkyl of 1 through 4 carbon atoms;
   X, Y, $R_1$ and $R_2$ are each selected from the group consisting of hydrogen, methyl, and ethyl; and
   (b) non-toxic acid addition salts of the compounds of
   (a) above.

2. 1 - amino - 4 - methylbicyclo[2.2.2]oct-2-ene hydrochloride.

3. 1 - (N - methylamino) - 4 - methylbicyclo[2.2.2] oct-2-ene hydrochloride.

4. 1 - (N,N - dimethylamino)-4-methylbicyclo[2.2.2] oct-2-ene hydrochloride.

5. α,4 - dimethylbicyclo[2.2.2]oct - 2 - ene-1-methylamine hydrochloride.

6. N,4 - dimethylbicyclo[2.2.2]oct - 2 - ene-methylamine hydrochloride.

7. N,N,4 - trimethylbicyclo[2.2.2]oct-2-ene-1-methylamine hydrochloride.

8. 4 - methylbicyclo[2.2.2]oct - 2 - ene - 1 - methylamine hydrochloride.

9. N - methylbicyclo[2.2.2]oct - 2 - ene - 1 - methylamine hydrochloride.

10. N,N - dimethylbicyclo[2.2.2]oct - 2-ene-1-methylamine hydrochloride.

11. α,α,4 - trimethylbicyclo[2.2.2]oct - 2-ene-1-methylamine hydrochloride.

References Cited

Wildman et al., JACS, 76, pp. 946–947 (1954).
Fischer et al., Helv. Chem. Acta., vol. 47, pp. 564–567 (1964).

CHARLES B. PARKER, Primary Examiner.

P. C. IVES, Assistant Examiner.

U.S. Cl. X.R.

167—65.2; 260—501.1, 544, 501.12, 514, 468, 586, 566, 665, 557